(12) United States Patent
Gao et al.

(10) Patent No.: US 9,355,635 B2
(45) Date of Patent: May 31, 2016

(54) METHOD AND SYSTEM FOR VIDEO SUMMARIZATION

(75) Inventors: Jizhou Gao, Lexington, KY (US); Yu Huang, Bridgewater, NJ (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1104 days.

(21) Appl. No.: 13/297,142

(22) Filed: Nov. 15, 2011

(65) Prior Publication Data

US 2012/0123780 A1    May 17, 2012

Related U.S. Application Data

(60) Provisional application No. 61/413,836, filed on Nov. 15, 2010.

(51) Int. Cl.
| | |
|---|---|
| H04N 7/10 | (2006.01) |
| H04N 7/025 | (2006.01) |
| G10L 15/02 | (2006.01) |
| H04N 21/44 | (2011.01) |
| H04N 21/435 | (2011.01) |
| H04N 21/4402 | (2011.01) |
| G06K 9/00 | (2006.01) |

(Continued)

(52) U.S. Cl.
CPC ............ *G10L 15/02* (2013.01); *G06K 9/00751* (2013.01); *G06K 9/00765* (2013.01); *G10L 15/08* (2013.01); *H04N 21/4358* (2013.01); *H04N 21/44008* (2013.01); *H04N 21/44016* (2013.01); *H04N 21/44029* (2013.01); *H04N 21/8549* (2013.01)

(58) Field of Classification Search
CPC .................... H04N 21/4358; H04N 21/44008; H04N 21/44016; H04N 21/44029
USPC ........................................................... 725/32
See application file for complete search history.

(56) References Cited

U.S. PATENT DOCUMENTS

| | | | |
|---|---|---|---|
| 5,664,227 A | 9/1997 | Mauldin et al. | |
| 6,331,859 B1 | 12/2001 | Crinon | |
| 6,751,776 B1 * | 6/2004 | Gong | 715/203 |

(Continued)

FOREIGN PATENT DOCUMENTS

| | | |
|---|---|---|
| CN | 101431689 A | 5/2009 |
| WO | WO 2010/115056 A2 | 10/2010 |

OTHER PUBLICATIONS

Extended European Search Report, Application No. 11840814.5, Applicant: Huawei Technologies Co., Ltd., dated Jul. 30, 2014, 6 pages.

(Continued)

*Primary Examiner* — Dominic D Saltarelli
(74) *Attorney, Agent, or Firm* — Slater Matsil, LLP

(57) ABSTRACT

A video summary method comprises dividing a video into a plurality of video shots, analyzing each frame in a video shot from the plurality of video shots, determining a saliency of each frame of the video shot, determining a key frame of the video shot based on the saliency of each frame of the video shot, extracting visual features from the key frame and performing shot clustering of the plurality of video shots to determine concept patterns based on the visual features. The method further comprises fusing different concept patterns using a saliency tuning method and generating a summary of the video based upon a global optimization method.

20 Claims, 4 Drawing Sheets

(51) Int. Cl.
*G10L 15/08* (2006.01)
*H04N 21/8549* (2011.01)

(56) References Cited

U.S. PATENT DOCUMENTS

| | | | |
|---|---|---|---|
| 6,964,021 | B2 | 11/2005 | Jun et al. |
| 7,263,660 | B2 | 8/2007 | Zhang et al. |
| 8,363,939 | B1 * | 1/2013 | Khosla .............. G06K 9/3241 382/164 |
| 2004/0085323 | A1 | 5/2004 | Divakaran et al. |
| 2004/0088723 | A1 | 5/2004 | Ma et al. |
| 2007/0101269 | A1 | 5/2007 | Hua et al. |
| 2008/0112684 | A1 | 5/2008 | Matsushita et al. |
| 2009/0083790 | A1 | 3/2009 | Wang et al. |
| 2011/0158510 | A1 * | 6/2011 | Aguilar .............. G06K 9/00718 382/159 |
| 2015/0199996 | A1 * | 7/2015 | Krishnamurthy .. G11B 27/3081 386/241 |

OTHER PUBLICATIONS

Smith, M., et al., "Video Skimming and Characterization through the combination of Image and Language Understanding Techniques", IEEE CVPR'97, pp. 775-781, Jun. 1997.

Gong, Y., et al., "Video Summarization Using Singular Value Decomposition," IEEE, in Proc. Int. Conf. Comput. Vis. Pattern Recognit., vol. 2, 2000, pp. 174-180.

Sundaram, H., et al., "A Utility Framework for the Automatic Generation of Audio-Visual Skims". ACM Multimedia'02, Dec. 2000.

Orriols, X., et al., "An EM algorithm for video summarization, generative model approach," in *Proc. Int. Conf. Comput. Vis.*, vol. 2, 2001, pp. 335-342.

Ma, Y-F., et al., "A user attention model for video summarization", ACM Multimedia, Dec. 2002, 10 pages.

Hua, X-S., et al., "AVE: Automated home video editing," ACM Multimedia 2003, pp. 490-497.

Lu, S., et al., "Video summarization by video structure analysis and graph optimization", IEEE ICME, Jun. 2004, pp. 1959-1962.

Peker, K.A., et al., "Adaptive Fast Playback-Based Video Skimming Using a Compressed-Domain Visual Complexity Measure", IEEE ICME, Jun. 2004, pp. 2055-2058.

Ngo, C-W., et al., "Video summarization and scene detection by graph modeling", IEEE T-CASVT, vol. 15(2), Feb. 2005, pp. 296-305.

Ren, R., et al., "Attention guided football video content recommendation on mobile devices", ACM International Conference on Mobile multimedia communications, Sep. 2006, 5 pages.

Simakov, D., et al., "Summarizing visual data using bi-directional similarity," *CVPR*, IEEE, 2008, 8 pages.

Evangelopoulos, G., et al., "Video event detection and summarization using audio, visual and text saliency", IEEE ICASSP, 2009, 4 Pages.

Chang, SF., "Video Indexing, Summarization, and Adaptation," Digital Video and Multimedia Lab ADVENT University-Industry Consortium, Columbia University, Nov. 4, 2002, 48 pages.

Chinese Search Report, Application No. 2011800546621, date Oct. 28, 2014, 2 pages.

Fei-Fei, L., et al., "A Bayesian Hierarchical Model for Learning Natural Scene Categories," Computer Vision and Pattern Recognition, IEEE Computer Society Conference, Jun. 20-25, 2005, vol. 2, pp. 524-531.

Fischler, M.A., et al., "Random Sample Consensus: A Paradigm for Model Fitting with Applications to Image Analysis and Automated Cartography," Graphics and Image Processing, 1981, vol. 24, pp. 381-395.

Lowe, D.G., "Object Recognition From Local Scale-Invariant Features," Computer Vision, The Proceedings of the Seventh IEEE International Conference, Sep. 1999, vol. 2, pp. 1150-1157.

Mallat, S.G., et al., "Matching Pursuits with Time-Frequency Dictionaries," IEEE Transactions Signal Processing, Dec. 1993, vol. 41, No. 12, pp. 3397-3415.

Ng, A.Y., et al., "On Spectral Clustering: Analysis and an Algorithm," Advances in Neural Information Processing Systems 2, 2002, pp. 849-856.

Peeters, G., "A Large Set of Audio Features for Sound Description (Similarity and Classification) in the CUIDADO Project," Apr. 23, 2004, 25 pages.

Shi, J,.et al., "Good Features to Track," IEEE Conference on Computer Vision and Pattern Recognition, IEEE Computer Society Conference, Jun. 21-23, 1994, pp. 593-600.

\* cited by examiner

FIG. 1
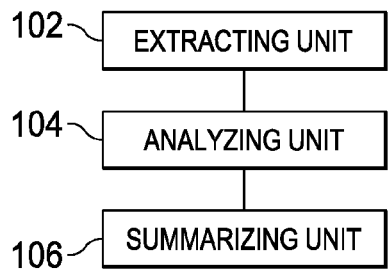
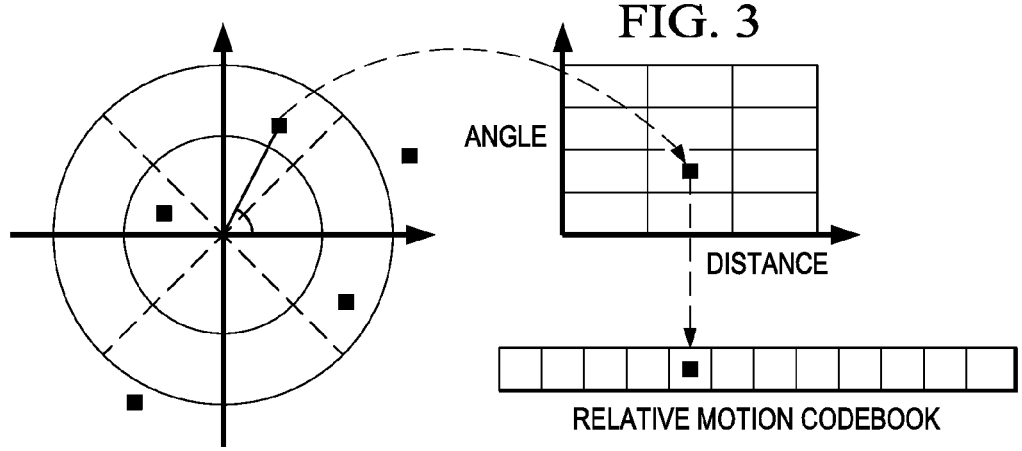
FIG. 6
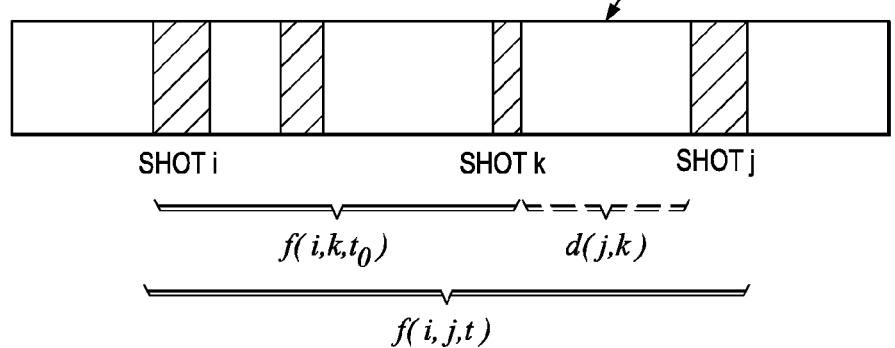

METHOD AND SYSTEM FOR VIDEO SUMMARIZATION

This application claims the benefit of U.S. Provisional Application No. 61/413,836, filed on Nov. 15, 2010, entitled "Method and System for Video Summarization," which application is hereby incorporated herein by reference in its entirety.

TECHNICAL FIELD

The present invention relates to image processing, and, in particular embodiments, to a method and system for video summarization.

BACKGROUND

The fast evolution of digital video has brought many new applications and consequently, research and development of new technologies, which will lower the costs of video archiving, cataloging and indexing, as well as improve the efficiency, usability and accessibility of stored videos are greatly needed. Among all possible research areas, one important topic is how to enable a quick browse of a large collection of video data and how to achieve efficient content access and representation.

To address these issues, video abstraction techniques have emerged and have been attracting more research interest in recent years. There are two types of video abstraction: video summary and video skimming. Video summary, also called a still abstract, is a set of salient images selected or reconstructed from an original video sequence.

Video skimming, also called a moving abstract, is a collection of image sequences along with the corresponding audios from an original video sequence. Video skimming is also called a preview of an original video, and can be classified into two sub-types: highlight and summary sequence. A highlight contains the most interesting and attractive parts of a video, while a summary sequence renders the impression of the content of an entire video. Among all types of video abstractions, summary sequence conveys the highest semantic meaning of the content of an original video.

One prior art method is uniform sampling the frames to shrink the video size while losing the audio part, which is similar to the fast forward function seen in many in digital video players. Time compression methods can compress audio and video at the same time to synchronize them, using frame dropping and audio sampling. However, the compression ratio can be limited by speech distortion in some cases. Frame-level skimming mainly relies on the user attention model to compute a saliency curve, but this method is weak in keeping the video structure, especially for a long video. Shot clustering is a middle-level method in video abstraction, but its readability is mostly ignored. Semantic level skimming is a method trying to understand the video content, but can be difficult to realize its goal due to the "semantic gap" puzzle.

SUMMARY OF THE INVENTION

In accordance with an embodiment, a method comprises dividing a video into a plurality of video shots, analyzing each frame in a video shot from the plurality of video shots, determining a saliency of each frame of the video shot, determining a key frame of the video shot based on the saliency of each frame of the video shot, extracting visual features from the key frame and performing shot clustering of the plurality of video shots to determine concept patterns based on the visual features. The method further comprises fusing different concept patterns using a saliency tuning method and generating a summary of the video based upon a global optimization method.

In accordance with another embodiment, a system comprises an extracting unit extracting a plurality of video shots from a video, an analyzer determining a saliency of each frame of a video shot from the plurality of video shots, a key frame determiner determining a key frame of the video shot based on the saliency of each frame in the video shot, a visual feature extractor extracting visual features from the key frame, a shot clustering block performing shot clustering of the plurality of video shots to determine concept patterns based on the visual features. The system further comprises a saliency tuning block performing fusing different concept patterns using a saliency tuning method and a summary generator generating a video summary based upon a global optimization method.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates a flow chart of an embodiment video summarization system;

FIG. 3 illustrates a procedure of generating a relative motion word in accordance with an embodiment;

FIG. 6 illustrates a substructure for a dynamic programming solution in accordance with an embodiment.

DETAILED DESCRIPTION OF ILLUSTRATIVE EMBODIMENTS

Figure 2:
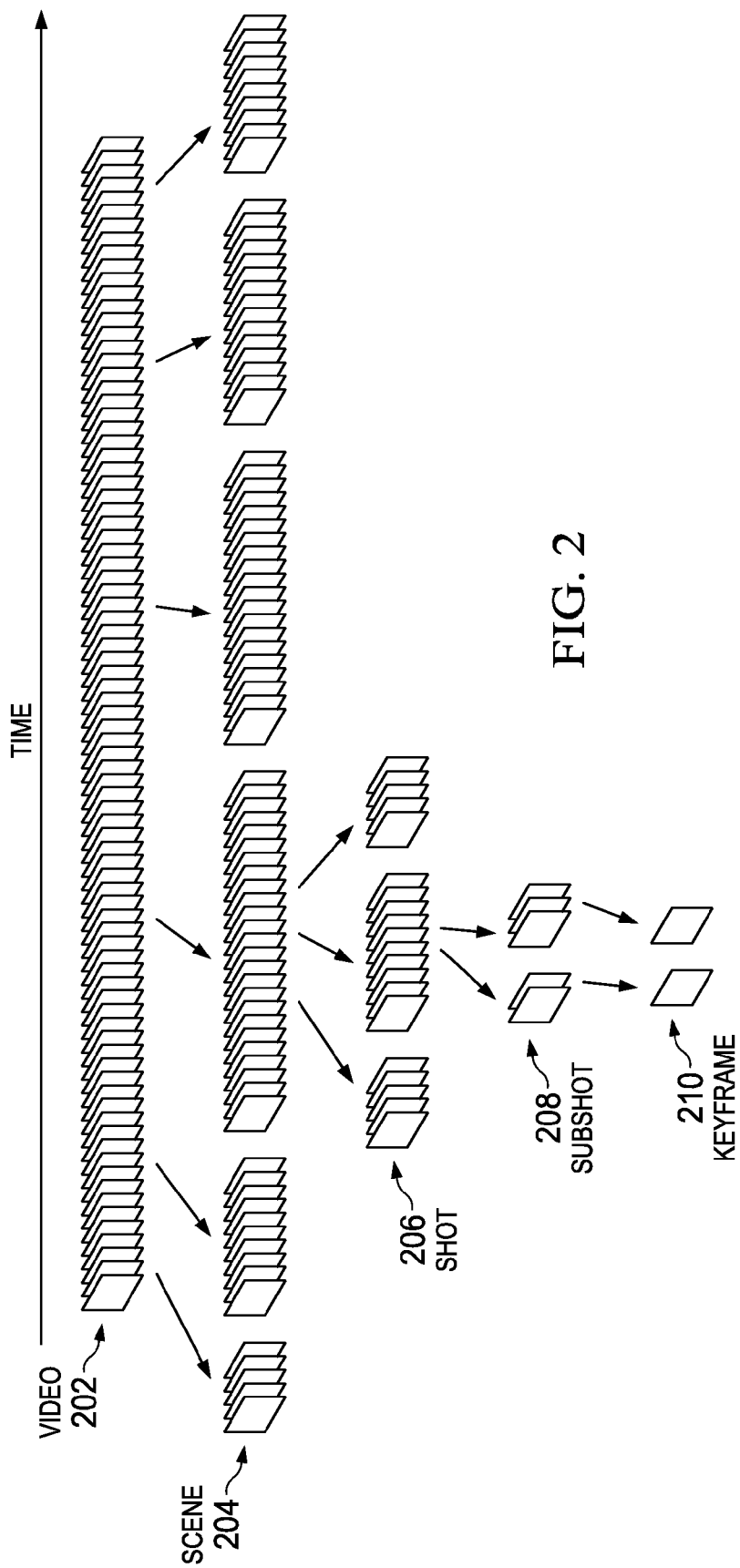
FIG. 2 illustrates a hierarchical structure of video scenes, shots and frames in accordance with an embodiment.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Video skimming is a task that shortens video into a temporally condensed version by which viewers may still understand the plot of original video. This technique allows viewers to quickly browse of a large multimedia library and thus facilitates tasks such as fast video browsing, video indexing and retrieval. The performance of video summarization mainly lies in the following two aspects, namely video highlights and information summary.

Video summarization enables viewers to quickly and efficiently grasp what a video describes or presents from a shorter summarized version. To meet this need, it is intuitive to extract the main skeleton from the original video, regard it as a set of video highlights and keep them in the summarized video. Video skeleton could be seen as a queue of concept patterns or a sequence of scenes with certain semantic implications in a temporal order.

Concept pattern here is not as high-level as real semantic concept, which is learned by human intervention. In this technique, concept pattern encodes the semantic meanings of shots (one shot is defined as a set of consecutive similar video frames and the transition between two consecutive shots is termed as the shot boundary), symbolizes shot group that portraits consistent semantic settings and generally possess the capability as a hallmark or self-evident clue that hints the development of the original video. Viewers may possibly recover the plot by only watching and hearing a handful of shots as long as all concept patterns are conveyed.

Typically, a video depicts sequential or simultaneous stories one after another. A shot itself does not have much meaning in a story though it is often regarded as a fundamental unit of a video production. Instead, a basic unit of the story can be a scene, which is defined as a sequence of interconnected and temporally adjacent shots depicting and conveying a common semantic thread.

A summary of a video is generally highly expected by viewers. Often in a video, there may be a few scenes illustrating the whole story and various shots conveying the same concept patterns. When selecting representative shots conveying a concept pattern, the ones generating the largest stimulus to the human attention would be favored, so that the resultant summarized video not only contains integral concept patterns, but also carefully selects shots with rich information to reflect the concept patterns. Moreover, it is also reasonable to select more shots from a long-elapsed scene which usually highlights an import story unit.

Though video highlights and shot concept pattern instances are vital to perceive the interesting content of a video, it is often uncomfortable for a viewer to continuously watch video highlights that are temporally far apart. Therefore, it is reasonable to include a few transition shots to fill the information gap between distant video highlights to overcome the sudden jump in the logical story illustration as well as preserve decent coverage of the overall information.

Concept patterns, mostly generated by clustering-based approaches do not necessarily enforce the criterion that the discovered summary highlights diverse aspects of the video. The summarization results with the optimal selection of video highlights can be easily skewed by uneven statistical distribution of the video segments such as shots or subshots. So a criterion called information coverage is required in the optimization objective to preserve the diversity of the video summarization. This criterion can work to span and distribute uniformly over the entire video in the objective function.

FIG. 1 illustrates a flow chart of an embodiment video summarization system. The method described in the immediately preceding paragraph can be implemented in a system as shown in FIG. 1. The embodiment video summarization system may include an extracting unit 102, an analyzing unit 104 and a summarizing unit 106. The extracting unit 102 is configured to extract visual and audio features at the frame level. The analyzing unit 104 is configured to analyze of shot concept patterns and scene structures. The summarizing unit 106 is configured to summarize the original video from the viewpoint of shot sequence reassembly.

The extracting unit 102 extracts visual, motion and audio features from the sampled frames in each shot. The visual and audio features include Scale Invariant Feature Transform (SIFT) features in a whole video frame, motion vectors of a moving object and Matching Pursuit (MP) decomposition of overlapped short-term audio segments in each shot.

The analyzing unit 104 analyzes the high-level concepts and structures of the original video. Video shots with similar content are grouped into shot concept patterns as the followings: the extracting unit 102 extracts Bag-of-Words (BoW) descriptors (SIFT based visual BoW descriptor, local motion BoW descriptor and Matching-pursuit based audio BoW descriptor) for each shot from the visual, motion and audio features extracted in the previous step, and then cluster the three types of BoW descriptors into several groups by spectral clustering, respectively. Each concept pattern (cluster) represents a set of video shots with similar visual, motion or audio content. Moreover, a number of interrelated shots unified by location or dramatic incident constitute a video scene in a scene transition graph (STG). The analyzing unit 104 can associate each shot with its semantic label such as visual concept pattern, and then identify the label subsequences that are of minimal length and contain recurring labels.

The summarizing unit 106 summarizes the original video from the viewpoint of shot sequence reassembly. The summarizing unit 106 generates the condensed video excerpt of the desired skimming length by concatenating a group of shots that no only contain maximum achievable saliency accumulation but also span and distribute uniformly over the entire video. The former criterion tries to preserve the video highlights such as interesting video scenes and shot concept patterns, and the latter one attempts to provide good information coverage of the whole video. In order to meet the above criteria, the summarizing unit 106 formulates a global optimization framework to address the shot selection problem and solve it by a dynamic programming method.

FIG. 2 illustrates a hierarchical structure of video scenes, shots and frames in accordance with an embodiment. As illustrated in FIG. 2, generally, a video 202 can be decomposed in a hierarchical form as "videos→scenes→shots→subshots→keyframes". In other words, the video 202 can be divided into a plurality of scenes 204. The scene 204 can be further divided into a plurality of shots 206. Each shot such as shot 206 may comprise a plurality of subshots 208. Each subshot may comprise a plurality of key frames 210.

The scene 204 is defined as a collection of semantically related and temporally adjacent shots, depicting and conveying a high-level concept. The shot 206, the fundamental unit of a video production, is an uninterrupted clip recorded by a single camera. The subshot 208 is a segment within a shot (e.g., shot 206) that corresponds to a unique camera motion, such as panning/tilting, zooming and static. The keyframe 210 is the frame which best represents the content of a shot (e.g., shot 206) or a subshot (e.g., subshot 208).

In accordance with an embodiment, temporal segmentation for video stream is archived using shot detection. A variance-difference based approach is used to detect a shot change, and robustly detects scene cuts and fades between scenes. The variance of a frame is calculated and the delta variance with its previous frame Dvar is recoded. In accordance with an embodiment, the criteria for Dvar to start a new shot are:

a. Dvar (current)<Th1 (stability requirement)
    b. maxDvar(start to current)−minDvar(start to current) >Th2 (tolerance requirement)
    c. Frame number in current shot>Th3 (shot length requirement)

In alternative embodiments, other techniques can be used. For example, shot boundaries can also be found using color histogram based approaches or optical-flow motion features. For processing convenience, in some embodiments, audio data are segmented into pieces, where each piece has its boundaries synchronized to its co-located video shot in time axis.

The subshot 208 is a segment within the shot 206. Generally, it is defined to contain a unique camera motion. Therefore, subshot segmentation can be accomplished through camera motion estimation. For example, consider a shot (e.g., shot 206) in which the camera moves as follows: zoom out, then pan from left to right and zoom in to a specified object and finally stop. This shot can then be divided into three subshots, including one zooming out, one panning, and one zooming in. Camera motion between two adjacent frames can be computed by estimating a two dimensional rigid transformation based on the corresponding KLT (Kanade-Lucas-Tomasi Feature Tracker) key point tracks on the two frames. Details about KLT are referred to in J Shi and C Tomasi (1994), "Good Features to Track," IEEE Conference on Computer Vision and Pattern Recognition, pages 593-600, which is incorporated herein by reference. Suppose a KLT key point is located at (x,y) in frame t, the corresponding KLT key point is tracked at (x',y') in frame (t+1), the transformation from (x,y) to (x',y') can be expressed as $$\begin{bmatrix} x' \\ y' \end{bmatrix} = A \begin{bmatrix} x \\ y \end{bmatrix} + b = \begin{bmatrix} s\cos\theta & s\sin\theta \\ -s\sin\theta & s\cos\theta \end{bmatrix} \begin{bmatrix} x \\ y \end{bmatrix} + \begin{bmatrix} b_x \\ b_y \end{bmatrix},$$

where s, θ, bx, by are camera parameters, s is the zooming factor, θ is the counterclockwise rotation degree, bx corresponds to the pan movement, and by corresponds to the tilt movement.

Given a set of KLT key point correspondences, the matrix A and vector b can be solved using the robust RANdom SAmple Consensus (RANSAC) rigid transformation estimation. The details about RANSAC are discussed in M. A. Fischler and R. C. Bolles (1981), "Random Sample Consensus: A Paradigm for Model Fitting with Applications to Image Analysis and Automated Cartography," Comm. of the ACM 24: 381-395, which is incorporated herein by reference.

Keyframes are the frames in a video sequence that can best represent the content of the video shots or subshots. Adaptive keyframe selection is employed to select keyframes according to an embodiment. An adaptive keyframe selection method is illustrated in Table. 1.

TABLE 1

Adaptive Keyframe Selection

| Motion type | Keyframe selection in a subshot |
| --- | --- |
| static | select the median frame |
| pan or tilt | sample every 20 frames |
| zoom | select the first and last frames |

In accordance with an embodiment, a video shot such as shot 206 can be characterized by three types of features: visual features, motion features and audio features.

With regard to visual features, Lowe's algorithm for SIFT feature detection in keyframes is employed. A frame is convolved with Gaussian filters at different scales, and then the differences of successive Gaussian-blurred versions are taken. Key points are located as maxima/minima of the Difference of Gaussians (DoG) that occur at multiple scales. Then, low-contrast key points are discarded, high edge responses are eliminated. After that, each key point is assigned one or more orientations based on the local gradient directions. Finally, a highly distinctive 128-dimension vector is generated as a visual feature vector. Details of SIFT are referred to in Lowe, David G. (1999), "Object recognition from local scale-invariant features," Int. Conference on Computer Vision. 2. pp. 1150-1157, which is incorporated herein by reference.

With regard to motion features, local motion information is obtained by computing the relative motion of the KLT key points in the foreground point set. After the ego-motion compensation phase, the relative motion of foreground points can be accurately derived by measuring the distance between corresponding foreground key points of two frames.

Suppose $P_t(i)=[x_t(i), y_t(i)]^T$ represents the ith KLT key point at frame t, after Δt frames, the corresponding key point is tracked at $p_{t+\Delta t}(i)=[x_{t+\Delta t}(i), y_{t+\Delta t}(i)]^T$, the rigid transformation matrix $A_t^{t+\Delta t}$ and vector $b_t^{t+\Delta t}$ are estimated based on all the key point correspondences from frame t to frame (t+Δt); the relative motion vector $m_t(i)$ can be computed as follows:

$$m_t(i) = p_{t+\Delta t}(i) - (A_t^{t+\Delta t} p_{t+\Delta t}(i) + b_t(i));$$

where this process is often known as the ego-motion compensation that tries to eliminate unexpected background motion caused by camera movement. Practically, the foreground point set contains a point $p_t(i)$ associated with its relative motion vector $m_t(i)$, whose 2-norm $\|m_t(i)\|_2 > M$, where M=max(wid,hei)/128, and (wid, hei) represents the video frame width and height. For example, for a typical 640×480 video frame size, M=5, which suggests a key point with more than 5 pixel shift should be regarded as a foreground point.

In accordance with an embodiment, the polar coordinate system is utilized to capture the angles and the distances of a relative motion vector. The Cartesian coordinates of a relative motion vector $m_t(i)=[x,y]^T$ can be transformed to its polar coordinate $r_t(i)=(\rho,\theta)$, where ρ is the distance and θ is the angle. A polar coordinate of a relative key point motion vector is used as a motion feature vector. A frame t is sampled every 10 frames in a shot, and Δt=5, to encourage large foreground motion and be robust to separate foreground and background key points.

With regard to audio features, the audio stream of a shot is chopped into multiple overlapped short-time audio segments with equal length. Audio feature extraction is then performed on those audio segments by Matching Pursuit (MP) decomposition. In order to improve the robustness of an audio feature, only audio segments above an acoustic saliency level are considered to avoid the negative effect on the accuracy exerted by low salient audio segments, due to its small value compared with noise.

In accordance with an embodiment, the MP method is employed to decompose an audio segment into a series of overlapped short-time audio segments. Although many acoustic features such as MFCC, LPCC for recognition purpose are available, they are only suitable for structured audio streams, such as music or speech. MP, however, is able to feature ambient sound and other unstructured sound, thus access much more information to enhance the awareness of a latent concept pattern.

For an audio word as a short-time audio segment with a certain length, its unique acoustic characteristic can be encoded by a set of base functions in a reference dictionary and corresponding correlation coefficients. The MP method enables an efficient sparse representation of the audio segment. MP decomposition is performed in an iterative fashion: at each step, a basis of a given dictionary is selected by maximizing the energy removed from the residual signal the iteration continues until the maximum number of loop or, equivalently, the number of basis used to reconstruct signal is reached. Thus, MP ensure the resultant sparse representation the most efficient in the sense that the reconstructed signal based on the selected basis takes up a larger percentage than any other decomposition method. Details of MP are discussed in S. G. Mallat and Z. Zhang, "Matching Pursuits with Time-Frequency Dictionaries," IEEE T-SP, December 1993, pp. 3397-3415, which is incorporated herein by reference.

In accordance with another embodiment, Gabor dictionary with Gabor waveform basis is employed. Each particular Gabor waveform is indexed by its scale, frequency and translation from origin as in the following Gabor function definition. MP is one type of greedy algorithm: starting from the original audio signal, each basis in the Gabor dictionary is paired with the signal to calculate their correlation coefficients. Then the basis with the biggest coefficients is chosen as it is most similar with the signal among all bases. Then residual signal is calculated as the difference of original signal from the reconstructed signal by the chosen basis. In the next iteration, the same operations are applied except for the original signal is replaced by the residual signal and the Gabor dictionary is the one with the chosen basis in last iteration removed. The process stops until the number of iterations reaches the maximum number specified.

The Gabor function is defined by $$g_{s,\mu,\omega,\theta}(n) = \frac{K_{s,\mu,w,\theta}}{\sqrt{s}} \exp^{-\pi(n-\mu)^2/s^2} \cos[2\pi\omega(n-\mu)+\theta]$$

where s, $\mu$, $\omega$, $\theta$ are scale, translation, frequency and initial phase respectively.

In accordance with an embodiment, the bases in Gabor dictionary all have 256-point length. To encode a short-time audio segment by MP decomposition, the length of the short-time audio segment is made to 256-point as well to neatly align with the Gabor base function. Applying MP, an audio segment can be represented by an audio feature vector, each entry of which symbolizes the coefficients of a selected Gabor basis. In accordance with an embodiment, the MP algorithm is implemented:

```
Input: Signal: f(t).
Output: List of coefficients: (a_n,g_γn)
Initialization:
    Rf_1 ← f(t)
Repeat
    g_γn ∈ D with maximum inner product (Rf_n,g_γn)
    a_n ← (Rf_n,g_γn)
    Rf_{n+1} ← Rf_n − a_n g_γn
    n ← n + 1
Until stop condition (for example: ||Rf_n|| < threshold).
```

Concept pattern learning is described in detail below. In accordance with an embodiment, Bag-of-Words (BoW) models are used to characterize the shot properties in visual, motion and audio domains, respectively. The Bag-of-Words (BoW) model was initially utilized in Natural Language Processing to represent the structure of a text. For example, a BoW model regards a text document as a collection of certain words belonging to a reference dictionary but ignores the order and semantic implications of words. A BoW model uses the occurrence of each word in the dictionary as the descriptor of text, thus it often ends up as a sparse vector. The BoW descriptor can be regarded as the "histogram representation based on independent features". As a result, a shot can be regarded as a text document with regard to some embodiments. However, since all of "visual words", "motion words" and "audio words" in a shot are not ready-for-use like the real words in text documents, and therefore those "words" need to be well defined. In accordance with an embodiment, the determination of a "word" usually involves two steps: codeword generation and feature extraction.

With the BoW descriptors available for each shot under both visual, motion and audio domains, shots in original video are ready for clustering to discover the latent concepts. Visual, motion and audio BoW models are processed independently so that they can provide mutual reliability to each other. A compelling clustering method would first be able to group the data correctly, even though the numbers of data in different clusters are considerably different. Spectral clustering method is used to learn the possible concept from shots, which can provide a state-of-the-art classification result.

A visual and audio BoW model is described in detail below. SIFT features are found on the keyframes of each shot. As a result, a shot as a bag has a collection of "visual-words", each of which is a vector of dimension of 128. The number of words in a shot is equal to the number of SIFT features found on all the key-frames in this shot. A shot containing SIFT features can now be regarded as a text document that has many words In order to generate the histogram representation as the BoW descriptor for the shot, a "codebook" ("dictionary") is built as the collection of a variety of "words" should be treated as one "codeword," as in text documents, "take", "takes", "taken" and "took" should be regarded as the same—"take", as its codeword. The bags of words in visual appearance are referred to in L. Fei-Fei and P. Perona, "A Bayesian Hierarchical Model for Learning Natural Scene Categories," IEEE CVPR'05. pp. 524-531, 2005, which is incorporated herein by reference.

A visual codeword can be considered as a representative of several similar SIFT features. K-means clustering over a variety of SIFT features is employed according to an embodiment. The variety of SIFT features are typically extracted from a long elapsed video offline. The number of the clusters is equal to the codebook size, which is analogous to the number of different words in a text dictionary. After clustering, codewords are the cluster centers, and each "word" in a shot is mapped to a certain codeword by finding the closest codeword measured by the 2-norm of vector difference in the high dimensional vector space.

As a result, each shot can be represented by a histogram of the codewords, each entry of which essentially records the number of occurrence of the codeword that the entry represents. Moreover, to construct a more powerful BoW histogram, the tf-idf weighting scheme is employed. The tf-idf weight is a statistical measure used to evaluate how important a codeword is to a document in a corpus. The importance increases proportionally to the number of times a word appears in the document but is offset by the frequency of the word in the corpus. For example, in a document BoW histogram, the document may contain 100 words wherein the word "cow" appears 3 times. The term frequency (tf) for "cow" is then 0.03 (3/100). Now, assume there may be 10 million documents and "cow" appears in one thousand of these. Then, the inverse document frequency (idf) is calculated as log (10^7/10^3)=4. The tf-idf weight is the product of the above quantities: 0.03×4=0.12. The final BoW histogram is regarded as the BoW descriptor. Consider the complexity of a video sequence; we suggest using 800 codewords for visual clustering.

The audio BoW model is quite similar to the visual BoW model; the only difference is that the raw audio feature is a vector of dimension of 256. In contrast, the audio BoW model uses 50 audio codewords.

A motion BoW model is described in detail below. The codeword generation process can be easily implemented by using the motion BoW model. Polar coordinates $r_r(i)=(\rho,\theta)$ can be used to represent the motion features. As a result, the polar coordinate system can be quantized into radial and angular bins to construct motion codewords.

FIG. 3 illustrates a procedure of generating a relative motion word in accordance with an embodiment As shown in FIG. 3, provided that the radial coordinate is divided into K bins and the angular coordinate is divided into N equal bins, the 2D bins are concatenated so as to construct the relative motion codebook with the size of K×N. And then each relative motion vector $r_r(i)$ can be put into one of the K×N bins to find the closest motion codeword. The rest techniques used in the motion BoW model is similar the one illustrated herein.

Empirically, the radial coordinate is divided into 4 bins: [5,8), [8,11), [11,18), [18,+∞) for a typical 640×480 frame size; and the angular coordinate is divided into 4 bins: [−45°, 45°), [45°,135°), [135°,225°), [225°,315°).

Concept learning by spectral clustering is described in detail below. To construct concept patterns the three types of BoW descriptors are clustered into several groups by spectral clustering, respectively.

Spectral clustering minimizes an objective function that cancels out the negative effect due to imbalanced division of number of members in different clusters. Thus even though original video contain concept patterns that consist of significantly different number of shot members, spectral clustering is free of artificial bias of a division of uniform number of members and is capable of dividing them correctly as long as the feature measure make the shots in same concept consistent.

Another advantageous feature of spectral clustering is that it favors to classify locally-correlated data into one cluster because it adds another constraint to distinguish the close-located or locally-connected data and increase their similarity to be divided into one group. By this constraint, the clustering result approaches human intuition that a cluster with consistent members is generally subject to a concentrated distribution.

By the virtue of spectral clustering, latent concepts are independent from the number allocation of shot members in different clusters. Meanwhile, due to the favor of locally-connected data into a single cluster, the learned concept tends to be self-contained, which is desirable to represent a video skeleton. The algorithm of spectral clustering is as follows, which is discussed in A. Y. Ng, M. I. Jordan, and Y. Weiss, "On spectral clustering: Analysis and an algorithm," Advances in Neural Information Processing Systems (NIPS) 14, 2002, which is incorporated herein by reference.

---

Normalized spectral clustering according to Ng, Jordan, and Weiss (2002)

Input: Similarity matrix $S \in \mathbb{R}^{n \times n}$, number k of clusters to construct.
- Construct a similarity graph by one of the ways described in Section 2. Let W be its weighted adjacency matrix.
- Compute the normalized Laplacian $L_{sym}$.
- Compute the first k eigenvectors $u_1, \ldots, u_k$ of $L_{sym}$.
- Let $U \in \mathbb{R}^{n \times k}$ be the matrix containing the vectors $u_1, \ldots, u_k$ as columns.
- Form the matrix $T \in \mathbb{R}^{n \times k}$ from U by normalizing the rows to norm 1, that is set $t_{ij} = u_{ij}/(\Sigma_k u_{ik}^2)^{1/2}$
- For $i = 1, \ldots, n$, let $y_i \in \mathbb{R}^k$ be the vector corresponding to the i-th row of T.
- Cluster the points $(y_i)_{i=1,\ldots,n}$ with the k-means algorithm into clusters $C_1, \ldots, C_k$.

Output: Clusters $A_1, \ldots, A_k$ with $A_i = \{j | y_j \in C_i\}$.

---

Video scene segmentation is described in detail below. A number of interrelated shots unified by location or dramatic incident constitute a scene. In order to segment video scenes, a shot is associated with its visual concept label. In a given scene, multiple visual concepts may co-exist. Therefore, the shots of these visual concepts are linked together with multiple shots of the same concept. Because of the intense interactions between shots in a scene, the use of a label sequence can be used to segment a video into scenes. The video scene segmentation method is referred to in M. Yeung, B Yeo, (1997) "Video visualization for compact presentation ad fast browsing of pictorial content," IEEE T-CASVT, 7(5), pp 771-785, which is incorporated herein by reference.

A scene transition graph (STG) is defined as a directed graph, such that "a node contains a collection of shots with sufficiently similar visual content and a directed edge is drawn from one node U to another node W if there is a shot in node U that immediately precedes a shot in node W". In fact, the user of a label sequence can be used to segment a video into large logical units, called Logical Story Unit (LSU), each of which closely approximates a semantic scene.

Let's denote a shot as $s_i$, its visual concept label as $L_i$, the last occurrence of label being A in the shot from g to (g+η) as last(A,g)=$\max_{g \leq i \leq g+\eta}$ (i: $L_i$=A), where i represents the shot index and η represent the maximum number of shots to look ahead (empirically, we set η=10). Construction of the L-table last(A,g) can derive the scene transition graph (STG). The algorithm to detect a scene proceeds as follows:

---

(1)  Set $l \leftarrow m$
     Set $e \leftarrow last(L_l, m)$
(2)  While $l \leq e$ do
        If $(last(L_l, m) > e)$ $e \leftarrow last(L_l, m)$
        $l \leftarrow l + 1$
(3)  Shots $S_m, S_{m+1}, \ldots, S_{m+e}$ constitutes a scene

---

The algorithm examines the sequence of labels and identifies the subsequences of labels that are of minimal length and which contains all the recurring labels. For example, given a video sequence with ten shots with the following labels: A,B,A,C,D,F,C,G,D,F, the first scene consists the first three shots, and the second scene consists the rest seven shots.

Saliency computation and scaling is described in detail below. The saliency computation method is carried out at each frame by fusing both visual saliency and audio saliency values. The method of saliency analysis has been explained in an earlier provisional application Ser. No. 61/371,458. In this invention, motion and spatial color saliency are combined, i.e. formulated into Quaternion Fourier Transform (QFT) of a quaternion image, and we also incorporate additional filmmaking and content cues to highlight the important shots by tuning up their saliency values.

A given frame t may comprise red r(t), green g(t), blue b(t) channels. Four broadly tuned color channels are created by the following equations:

$$R(t)=r(t)-(g(t)+b(t))/2$$

$$G(t)=g(t)-(r(t)+b(t))/2$$

$$B(t)=b(t)-(r(t)+g(t))/2$$

$$Y(t)=(r(t)+g(t))/2-|r(t)-g(t)|/2-b(t)$$

In addition, two color difference channels are defined as follows:

$$RG(t)=R(t)-G(t)$$

$$BY(t)=B(t)-Y(t)$$

The intensity channel is calculated as follows:

$$I(t)=(r(t)+g(t)+b(t))/3$$

The motion channel takes the absolute difference between intensity map I(t) and ego-motion compensated intensity map I(t−τ) as follows:

$$M(t)=|I(t)-(A_{t-\tau}^{t}I(t-\tau)+b_{t-\tau}^{t})|$$

where $A_{t-\tau}^{t}$ and $b_{t-\tau}^{t}$ are the estimated camera parameters from frame (t−τ) to frame t.

The frame t can be represented as a quaternion image q(t) as follows:

$$q(t)=M(t)+RG(t)\mu_1+BY(t)\mu_2+I(t)\mu_3$$

where $\mu_j^2=-1$, j=1, 2, 3; and $\mu_1 \perp \mu_2$, $\mu_1 \perp \mu_3$, $\mu_2 \perp \mu_3$, $\mu_3=\mu_1\mu_2$. Furthermore, q(t) can be represented in symplectic form as follows:

$$q(t)=f_1(t)+f_2(t)\mu_2$$

$$f_1(t)=M(t)+RG(t)\mu_1$$

$$f_2(t)=BY(t)+I(t)\mu_1$$

A Quaternion Fourier Transform (QFT) is performed on the quaternion image q(m,m,t). The QFT of the quaternion image q(m,m,t) is:

$$Q[u, v] = F_1[u, v] + F_2[u, v]\mu_2$$

$$F_i[u, v] = \frac{1}{\sqrt{MN}}\sum_{m=0}^{M-1}\sum_{n=0}^{N-1} e^{-\mu_1 2\pi((mv/M)+(nu/N))} f_i(n, m)$$

where (m,m) and (u,v) are the locations of each pixel in time and frequency domain, respectively; N and M are the image's height and width.

The inverse transform can be written as follows:

$$f_i(n, m) = \frac{1}{\sqrt{MN}}\sum_{v=0}^{M-1}\sum_{u=0}^{N-1} e^{\mu_1 2\pi((mv/M)+(nu/N))} F_i[u, v]$$

A frequency domain representation Q(t) of the quaternion image q(t) can be rewritten in the polar form as follows:

$$Q(t)=\|Q(t)\|e^{\mu\Phi(t)}$$

where $\Phi(t)$ is the phase spectrum of Q(t).

In the equation shown above, if $\|Q(t)\|=1$, the frequency domain representation Q(t) of the quaternion image q(t) includes only the phase spectrum in frequency domain. Therefore, the inverse Quaternion Fourier Transform (IQFT) of the phase spectrum of the frequency domain representation Q(t) of the quaternion image q(t) may be performed. The IQFT of the phase spectrum q'(t) is a 2-D image map and may be computed as follows:

$$q'(t)=a(t)+b(t)\mu_1+c(t)\mu_2+d(t)\mu_3$$

The saliency map (sM(t)) of frame t may be obtained by taking a smoothing filter kernel and running a convolution with the 2-D image map q'(t):

$$sM(t)=g*\|q'(t)\|^2$$

where g is a 2-D Gaussian smoothing filter. In various embodiments, for computation efficiency, only the Phase Spectrum of Quaternion Fourier Transform (PQFT) on a resized image (e.g., whose width equals to 128) may be computed.

Next, the visual saliency value $S_v(t)$ of frame t can be computed by taking the average over the entire saliency map as follows:

$$S_v(t) = \frac{1}{MN}\sum_{m=0}^{M-1}\sum_{n=0}^{N-1} sM(n, m, t)$$

In an embodiment, the robustness of an audio BoW feature is improved by taking into account audio words above an acoustic saliency level to avoid the negative effect on the BoW accuracy exerted by audio words of low saliency. This can be due to its small value compared with noise. Here, audio saliency is measured by a variety of low-level audio features (scalar values), including Spectral Centroid, Root Mean Square (RMS), Absolute Value Maximum, Zero-Crossing Ratio (ZCR), and Spectral Flux. By using saliency masking, the audio words experience a reliability test so that the accuracy of features for every word is increased.

Spectral centroid is the center of the spectrum of the signal. It is computed by considering the spectrum as a distribution whose values are the frequencies and the probabilities to observe these are the normalized amplitude. Root mean square is a measure of short time energy of a signal from norm 2. Absolute Value Maximum is a measure of short time energy of a signal from norm 1. The zero-crossing is a measure of the number of time the signal value cross the zero axis. These measures are further discussed by G. Peeters, "A large set of audio features for sound description (similarity and classification) in the CUIDADO project," 2003, which is incorporated herein by reference. See also http://www.ircam.fr/anasyn/peeters/ARTICLES/Peeters_2003_cuidadoaudiofeatures.pdf, which is incorporated herein by reference.

Figure 4:
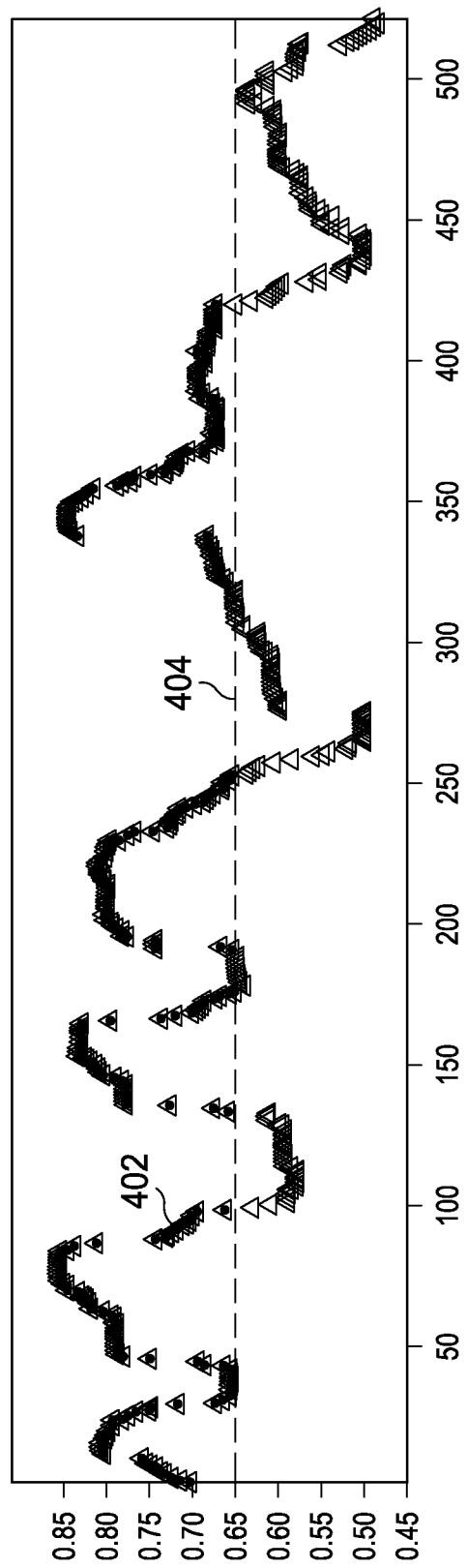
FIG. 4 illustrates an embodiment saliency masking of audio words.

FIG. 4 illustrates saliency masking of audio words. Within a shot, only a certain amount of short-time audio segments masked from the whole audio signal of the shot are sparsely decomposed by MP to form BoW features. These segments are chosen if their low-level feature is above a threshold. For example, audio saliency 402 above the threshold 404 is chosen in accordance with an embodiment.

In accordance with an embodiment, the audio saliency value as $S_a(t)$ computed on the audio clip is aligned with the boundary of video frame t.

With regard to Saliency Tuning, Camera motion is always utilized to emphasize or neglect a certain objects or a segment of a video, that is, to guide viewers' attentions. By using the rigid motion estimation, the camera motion type and speed can be determined robustly. However, the challenge is how to map these camera parameters to the effect they have in attracting the viewer's attention. The camera attention model based on some general camera work rules is given by Y Ma, L Lu, H Zhang, M Li, "A user attention model for video summarization," ACM Multimedia, 2002, pp 533-542, which is incorporated herein by reference.

An attention factor $\omega_{cm}(t)$ caused by camera motion is quantified to the range of [0-2]. A value greater than 1 means emphasis. In contrast, a value smaller than 1 means neglect. The user attention based model is obtained based on the following assumptions from general movie production. First, zooming is assumed to emphasize something. In particular, the speed of zooming scales linearly with the importance of the media segment. Therefore, faster zooming speeds describe important content. Usually, zoom-in is used to emphasize details, while zoom-out is used to emphasize an overview scene. Second, a video producer may apply panning if the video producer wants to neglect or de-emphasize something. As in zooming, the speed of the panning operation may be used a metric of importance. Unlike zooming, the faster the panning speed is, the less important the content is.

Figure 5:
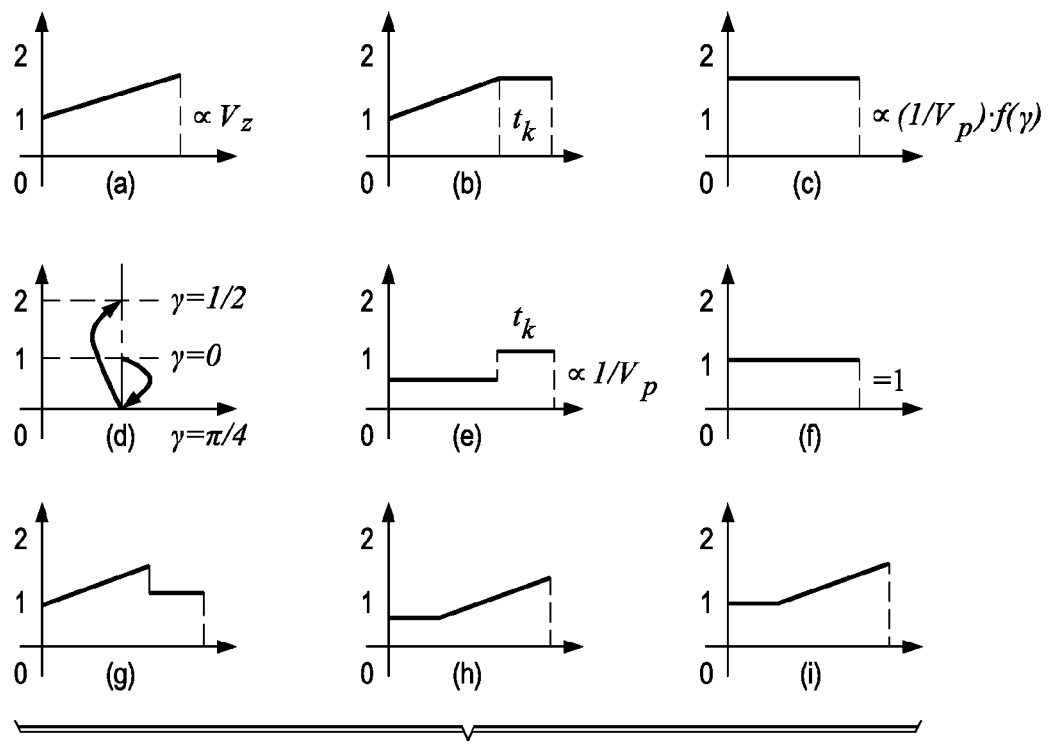
FIG. 5 illustrates an embodiment method of how to set the scaling factors of a plurality of views based upon different camera movements.

FIG. 5 illustrates an embodiment method of how to set the scaling factors of a plurality of views based upon different camera movements. These views illustrate camera motion by (a) Zooming, (b) Zooming followed by still, (c) Panning, (d) Direction mapping function of panning, (e) Panning followed by still, (f) Still and other types of camera motion, (g) Zooming followed by panning, (h) Panning followed by zooming, (i) Still followed by zooming.

Visual and audio saliency fusion is described in detail below. The visual saliency value $S_v(t)$ of frame t is then scaled by the corresponding camera attention factor $\omega_{cm}(t)$ as $S_v(t) \leftarrow \omega_{cm}(t) \cdot S_v(t)$. The linear fusion of visual and audio saliency values of frame t can be computed as follows:

$$S(t) = \alpha \tilde{S}_v(t) + (1-\alpha) \tilde{S}_a(t),$$

$$\tilde{S}_v(t) = \frac{S_v(t) - \min_{t'}\{S_v(t')\}}{\max_{t'}\{S_v(t')\} - \min_{t'}\{S_v(t')\}},$$

$$\tilde{S}_a(t) = \frac{S_a(t) - \min_{t'}\{S_a(t')\}}{\max_{t'}\{S_a(t')\} - \min_{t'}\{S_a(t')\}}$$

where $\tilde{S}_v(t)$ and $\tilde{S}_a(t)$ are the normalized visual and audio saliency values, respectively; $\alpha \in [0,1]$ controls the relative importance between visual and audio saliency, which is typically set to 0.5.

In addition, shot saliency X(s) of shot s can be defined as follows:

$$X(s) = \frac{1}{\text{len}(s)} \sum_{t \in s} S(t)$$

where X(s) takes the average saliency values of the frames in shot s, and len(s) represents the number of frames in shot s.

As each shot concept pattern encodes distinct high-level semantic meanings, it is reasonable to expect the final video excerpt should include a variety of shot concepts. Each concept should provide at least one shot in the skimmed video as a hard constraint. In accordance with an embodiment, a shot saliency tuning technique is employed to indirectly encourage the skimmed video to select those top-ranked salient shots in each concept.

Suppose a shot s is in visual concept $C_V^i$, its saliency X(s) ranks the top p percentile over all shots in $C_V^i$, $|C_V^i|$ represents the number of shots in $C_V^i$, $Med_V$=Median($\{C_V^i: \forall i\}$) represents the median of the number of shots in all of visual concepts, $Min_V$=min($\{C_V^i: \forall i\}$) represents the smallest number of shots in visual concepts, and the target skimming ratio is given as $R_t$%; the scaling factor $\omega_{cp}^V(s)$ of shot s in visual concept $C_V^i$ is defined as follows:

$$\omega_{cp}^V(s) = 1 + \exp\left(-0.3 \cdot \frac{p}{R_t}\right) \cdot \xi(|C_V^i|), \quad s \in C_V^i$$

$$\xi(|C_V^i|) = \begin{cases} 1.0 & |C_V^i| \geq Med_V/2 \\ 0.5 + 0.5 \frac{|C_V^i| - Min_V}{Med_V/2 - Min_V} & \text{otherwise} \end{cases}$$

For example, if the target skimming ratio is given as 10%, and then the top 10% salient shots in a relatively large visual concept are more likely to be included in the skimmed video, because their saliency values are rescaled to at least 1.7 times as exp(−0.3)=0.74082.

The scaling factor $\omega_{cp}^A(s)$ for audio concepts and the scaling factor $\omega_{cp}^M(s)$ for motion concepts can be calculated in a similar way. The combined scaling factor $\omega_{cp}(s)$ from all of the three types of concepts can be defined as follows:

$$\omega_{cp}(s) = \rho_V \omega_{cp}^V(s) + \rho_A \omega_{cp}^A(s) + (1 - \rho_V - \rho_A) \omega_{cp}^M(s)$$

where $\rho_V, \rho_A \in [0,1]$; $\rho_V + \rho_A \leq 1$ balance the relatively importance of the video, audio and motion concepts. In accordance with an embodiment, $\rho_V$=0.5, $\rho_A$=0.3.

With video scene highlights, similar to concept pattern highlights, the saliency values of shots from long elapsed can be scaled up. As a result, they become important scenes. Suppose shot s is in scene $sc_i$, and $|sc_i|$ defines the number of shots in scene $sc_i$, the scaling factor $\omega_{sc}(s)$ of shot s in scene $sc_i$ is computed as follows:

$$\omega_{sc}(s) = \begin{cases} 4.0 & |sc_i| \geq 10 \\ 2.0 & 5 \leq |sc_i| 10 \\ 1.0 & \text{otherwise} \end{cases}$$

After the tuning step, the shot saliency X(s) of shot s is computed as follows:

$$X(s) \leftarrow \omega_{sc}(s) \cdot \omega_{cp}(s) \cdot X(s)$$

Video skimming via dynamic programming is described in detail below. FIG. 6 illustrates a substructure for a dynamic programming solution in accordance with an embodiment. In order to preserve both video highlights and decent information coverage, a Dynamic Programming (DP) algorithm is used to solve the video skimming problem. A value function f (i, j, t) represents a shot sequence 602 that starting at shot i, ending at shot j and contains γ·t frames. In accordance with an embodiment, γ=30, which is the minimal shot length. It should be noted that the shot sequence 602 does not need to be continuous but only fixes at two endpoints. Illustrated in FIG. 6, the value function f(i,j,t) can be maximized as follows:

$$f(i, j, t) = \begin{cases} \max_{\substack{i \le k < j \\ t = t_0 + len(j)/\gamma}} \left\{ \begin{array}{l} f(i, k, t_0) + X(j) + \\ \lambda \exp(-|d(j,k) - \overline{d}|/\beta) \end{array} \right\} & j > i \\ X(i) & j = i \\ -\infty & j < i \end{cases}$$

where length(j) represent the length of shot j, i.e., the number of frames in shot j, d(j,k) represents the number of frames between shot j and shot k, $\overline{d}$ represents the average number of frames between two nearby shots in the uniform sampling of shot pairs if all shots are assumed to take the average shot length.

Given the target skimming ratio, the starting and ending shots can be searched as follows:

$$(\text{start, end}) = \underset{i,j}{\text{argmax}} \; f(i, j, t \approx \text{desire skim length}/\gamma)$$

It is a constrained optimization problem. Brute-force searching is feasible but inefficient; instead, it can be solved with DP due to existence of an optimal substructure. With the calculation of the object function value f(i,j,t) and all optimal sub-solutions, the in-between shots can be easily traced back through the optimal path. It should be noted that it is often than not the shots near the beginning or ending of a video are extremely important, and therefore, instead of searching the starting and ending shots globally, a user can also limit the search range or even fix the starting and/or ending shots.

Figure 7:
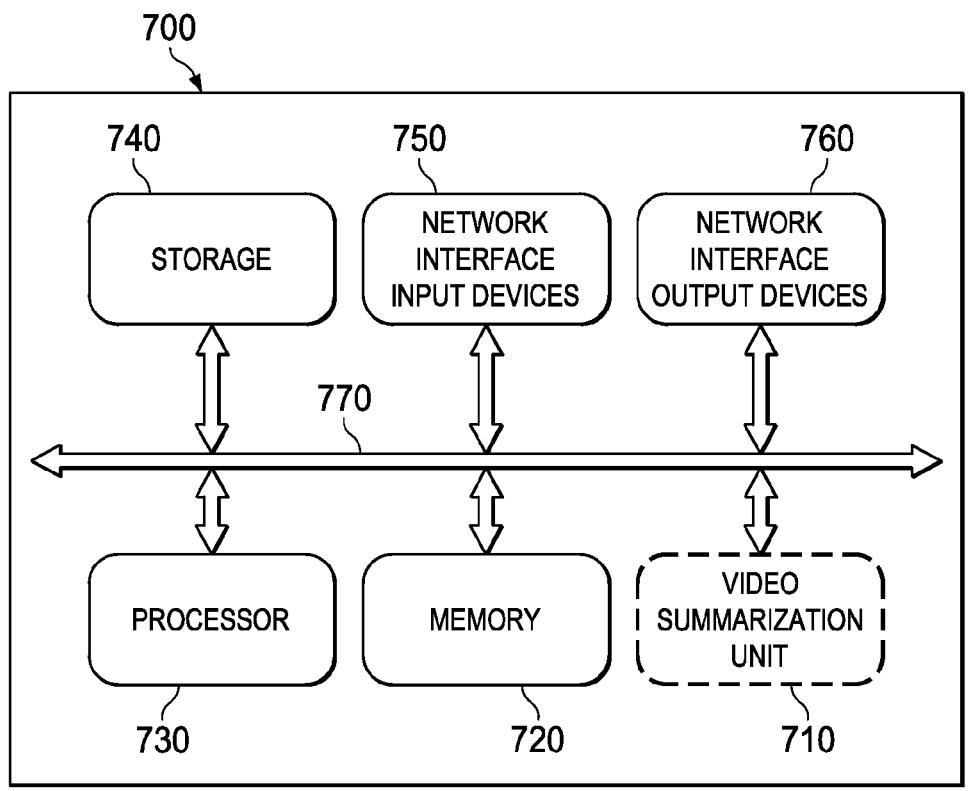
FIG. 7 illustrates a simplified block diagram of a computer system that can be used to implement the video summarization method in accordance with an embodiment.

FIG. 7 illustrates a simplified block diagram of a computer system that can be used to implement the video summarization method in accordance with an embodiment. The computer system 700 includes a video summarization unit 710, a memory 720, a processor 730, a storage unit 740, network interface input devices 750, network interface output devices 760 and a data bus 770. It should be noted that this diagram is merely an example of a personal computer, which should not unduly limit the scope of the claims. Many other configurations of a personal computer are within the scope of this disclosure. One of ordinary skill in the art would also recognize the advanced media preview method may be performed by other computer systems including a portable computer, a workstation, a network computer, or the like.

The video summarization unit 710 may be a physical device, a software program, or a combination of software and hardware such as an Application Specific Integrated Circuit (ASIC). In accordance with an embodiment, when the computer receives a video file through the network interface input devices 750, the processor 730 loads the video file into the storage unit 740. According to an embodiment where the video summarization method is implemented as a software program, the process 730 loads the software program from the storage unit 740 and operates it in the memory 720. After the processor 730 performs the steps of FIG. 1, the processor 730 sends the video summarization results to the end user through a network interface output devices 760.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
dividing a video into a plurality of video shots;
analyzing each frame in a video shot from the plurality of video shots;
determining a saliency of each frame of the video shot;
determining a key frame of the video shot based on the saliency of each frame of the video shot;
extracting visual features from the key frame;
performing shot clustering of the plurality of video shots to determine concept patterns based on the visual features;
fusing different concept patterns using a saliency tuning method, wherein a saliency value obtained in the saliency tuning method is generated by fusing a visual saliency value, an audio saliency value, a motion saliency value and a spatial color saliency value; and
generating a summary of the video based upon a global optimization method.

2. The method of claim 1, further comprising generating the summary of the video based upon a dynamic programming method.

3. The method of claim 1, further comprising extracting audio features from the video shot, wherein extracting audio features comprises:
determining audio words from the video shot; and
performing clustering on the audio words.

4. The method of claim 3, wherein determining audio words comprises:
deriving a first set of audio words; and
calculating a saliency measure for each of the audio words.

5. The method of claim 4, wherein decomposing audio words into a series of overlapped short-time audio segments using matching pursuit decomposition method.

6. The method of claim 4, further comprising performing the saliency masking comprises comparing the saliency measure to a threshold and eliminating audio words having a saliency measure on one side of the threshold.

7. The method of claim 1, further comprising determining the saliency of each frame of the video shot using a dynamic programming method.

8. The method of claim 1, wherein determining the key frame comprises selecting a frame in the video shot with a balance between content highlights and information coverage.

9. The method of claim 1, wherein extracting visual features comprises determining a collection of visual words based on extracted visual features.

10. The method of claim 9, further comprising dividing the video into a plurality of shots by extracting visual, motion and audio features of each shot.

11. The method of claim 1, wherein performing shot clustering comprises clustering to determine concept patterns among multiple shots; and
grouping shots into concept categories.

12. A system comprising:
an extracting unit extracting a plurality of video shots from a video;
an analyzer determining a saliency of each frame of a video shot from the plurality of video shots;
a key frame determiner determining a key frame of the video shot based on the saliency of each frame in the video shot;
a visual feature extractor extracting visual features from the key frame;
a shot clustering block performing shot clustering of the plurality of video shots to determine concept patterns based on the visual features;
a saliency tuning block performing fusing different concept patterns using a saliency tuning method, wherein a saliency value obtained in the saliency tuning method is generated by fusing a visual saliency value, an audio saliency value, a motion saliency value and a spatial color saliency value; and
a summary generator generating a video summary based upon a global optimization method, wherein the global optimization method is carried out in a plurality of limited ranges, and wherein the plurality of limited ranges include a first range comprising a starting shot and a second range comprising an ending shot.

13. The system of claim 12, further comprising:
an audio feature determination block determining audio features from the video shot;
an audio saliency determination block determining saliency of the determined audio features;
an audio word clustering block clustering determined audio features; and
an audio and video concept aligning audio and video concept categories.

14. The system of claim 12, further comprising:
a video summary generator generating a video summary based on a dynamic programming method.

15. The system of claim 12, further comprising:
a video summary generator generating a video summary based upon a balance between maximum achievable saliency and video information coverage.

16. The system of claim 12, further comprising:
a video summary generator generating a video summary to preserve both content highlights and video information coverage.

17. A non-transitory computer readable medium with an executable program stored thereon, wherein the program instructs a microprocessor to perform the following steps:
analyzing each frame in a video shot from a plurality of video shots, analyzing comprising determining a saliency of each frame of the video shot;
determining a key frame of the video shot based on the saliency of each frame the video shot;
extracting visual features from the key frame;
performing shot clustering of the plurality of video shots to determine concept patterns based on the visual features;
fusing different concept patterns using a saliency tuning method, wherein a saliency value obtained in the saliency tuning method is generated by fusing a visual saliency value, an audio saliency value, a motion saliency value and a spatial color saliency value; and
generate a video summary based upon a global optimization method.

18. The non-transitory computer readable medium of claim 17, wherein the program instructs the microprocessor to further perform the steps of:
determining audio features of the video shot;
determining saliency of the audio features;
clustering determined audio features; and
aligning audio and video concept categories.

19. The non-transitory computer readable medium of claim 17, wherein the program instructs the microprocessor to further perform the step of generating a video summary based on the global optimization method.

20. The non-transitory computer readable medium of claim 17, wherein the program instructs the microprocessor to further perform the step of generating a video summary based on a dynamic programming method.

* * * * *